United States Patent [19]

Henry

[11] Patent Number: 5,755,402

[45] Date of Patent: May 26, 1998

[54] DISCOID AIRSHIP

[76] Inventor: Roy Henry, 403 Joyce Ave., Temple Terrace, Fla. 33617

[21] Appl. No.: 624,080

[22] Filed: Mar. 29, 1996

Related U.S. Application Data

[63] Continuation-in-part of Ser. No. 259,078, Jun. 13, 1994, abandoned, which is a continuation-in-part of Ser. No. 82,733, Jan. 3, 1994, abandoned.

[51] Int. Cl.[6] ............................................. B64B 1/36
[52] U.S. Cl. .............................. 244/29; 244/30; 244/52; 244/128
[58] Field of Search ............................ 244/12.2, 23 C, 244/30, 24, 29, 115, 116, 52, 26, 51, 125, 128; 280/515

[56] References Cited

U.S. PATENT DOCUMENTS

| 2,180,558 | 11/1939 | Stastny | 280/515 |
|---|---|---|---|
| 2,874,921 | 2/1959 | Knighton et al. | 244/115 |
| 2,959,374 | 11/1960 | Laskowitz | 244/52 |
| 3,048,353 | 8/1962 | Holmes | 244/52 |
| 3,190,584 | 6/1965 | Gire et al. | 244/52 |
| 3,218,800 | 11/1965 | Ensinger | 244/52 |
| 3,309,041 | 3/1967 | Etchberger | 244/52 |
| 3,321,156 | 5/1967 | McMasters | 244/30 |
| 3,525,485 | 8/1970 | Pfaff et al. | 244/52 |
| 3,912,192 | 10/1975 | Shirley | 244/116 |
| 4,014,483 | 3/1977 | MacNeill | 244/23 C |
| 4,114,837 | 9/1978 | Pavlecka et al. | 244/26 |
| 4,326,681 | 4/1982 | Eshoo | 244/30 |
| 4,901,948 | 2/1990 | Panos | 244/52 |
| 5,351,911 | 10/1994 | Neumayr | 244/5 |

FOREIGN PATENT DOCUMENTS

| 1267553 | 5/1968 | Germany | 244/23 C |
|---|---|---|---|
| 2540659 | 3/1977 | Germany | 244/30 |
| 2027403 | 7/1978 | United Kingdom | 244/52 |

Primary Examiner—Galen L. Barefoot
Attorney, Agent, or Firm—David Kiewit

[57] ABSTRACT

An airship capable of vertical and horizontal flight and able to make right angle turns is preferably of nearly neutral buoyancy and comprises two gas bags, the lower of which is toroidal in shape and surrounds a centrally located engine that has a downwardly facing inlet. Upwardly directed thrust from the engine is redirected by a gate valve arrangement into a manifold of ducts, each of which passes between the upper and lower gas bags to a respective outlet or nozzle adjacent the periphery of the aircraft. To fly the aircraft, a pilot uses the cable-operated valve arrangement to manage the distribution of thrust from the engine into selected ones of the ducts to provide thrust in a desired direction. Preferred pilot operated controls comprise a foot pedal and a rotatable steering wheel mounted on a pedestal hingedly attached to the gondola of the aircraft for fore and aft pivoting motion. An additional feature of the airship is a mooring arrangement allowing the pilot to taxi into a position in which a generally L-shaped rod or probe attached to the gondola of the airship engages a U-shaped eyelet attached to the ground.

9 Claims, 6 Drawing Sheets

DISCOID AIRSHIP

CROSS REFERENCE TO RELATED APPLICATIONS

This application is a continuation-in-part of the inventor's U.S. application Ser. No. 08/259,078, filed Jun. 13, 1994, which is abandoned on the filing hereof and which was a continuation in part of U.S. Pat. No. 08/082,733, now abandoned.

BACKGROUND OF THE INVENTION

1. Field of the invention

The present invention relates to buoyant airships and to control and docking arrangements therefor.

2. Description of Prior Art

In U.S. Pat. No. 3,321,156, McMaster teaches a discoidal airship sustained by a buoyant gas in a toroidal gas bag that surrounds a centrally disposed engine having a generally upwardly facing inlet and a generally downwardly facing outlet, the engine gimbaled for tilting motion relative to a vertical axis.

In DT 2,540,659 Conte' describes an airship having a centrally disposed engine, the thrust from which is distributed, via ducts, to ones of a plurality of nozzles disposed adjacent the periphery of the airship. Gate valves within the ducts are employed by Conte' to control the thrust from each of the nozzles.

In GB 2,027,403 Brownhill teaches the control of the horizontal motion of a dirigible by using jointed, deflected ducts to selectively convey the thrust from an engine to ones of sixteen steerable nozzles disposed adjacent the periphery and approximately at the midpoint of the height of the dirigible's gas bag.

SUMMARY OF THE INVENTION

The invention provides an airship capable of vertical and horizontal flight and able to make right angle turns. The airship is preferably of nearly neutral buoyancy and comprises two gas bags, the lower of which is toroidal in shape and surrounds a centrally located engine having a downwardly facing inlet. Upwardly directed thrust from the engine is redirected by a gate or gate type valve arrangement into a manifold of ducts, each of which passes between the upper and lower gas bags to a respective outlet adjacent the periphery of the aircraft. To fly the aircraft, a pilot uses the cable-operated valve arrangement to manage the distribution of thrust from the engine into selected ones of the ducts to provide thrust in a desired direction.

It is an object of the invention to provide a forced-air control system for an airship that has an engine disposed above a gondola in a vertical attitude and that has a downward facing intake and an upward facing exhaust and thrust outlet. The system comprises a manifold valve assembly above the engine's outlet, the valve assembly controlled by a pilot to direct thrust from the engine to selected ones of a plurality of fixed nozzles disposed adjacent the periphery of the airship. It is a specific object of the invention to provide such a system comprising eleven such ducts and nozzles.

It is a further object of the invention to provide a set of pilot-operated controls for a system that controls the motion of an airship by selectively directing the thrust from an engine to ones of a plurality of thrust nozzles generally disposed adjacent the periphery of the airship. The preferred pilot operated controls comprise a foot pedal and a rotatable steering wheel mounted on a pedestal hingedly attached to the gondola of the aircraft for fore and aft pivoting motion. Sheathed cables connect the pilot-operated control elements with the engine throttle and with a manifold valve arrangement controlling distribution of the engine thrust to the nozzles.

It is an additional object of the invention to provide a mooring arrangement for an airship in which a generally L-shaped rod or probe attached to the gondola of the airship cooperates with a U-shaped eyelet fixedly attached to the ground. This ground locking unit allows a pilot of the airship to taxi the airship toward the eyelet and to stop the airship when the rod has engaged the eyelet. When the ground locking unit has been engaged, weight can be removed from the airship (e.g., by a passenger stepping out of the gondola) without causing the airship to become accidentally airborne.

DESCRIPTION OF THE PREFERRED EMBODIMENT

Figure 1:
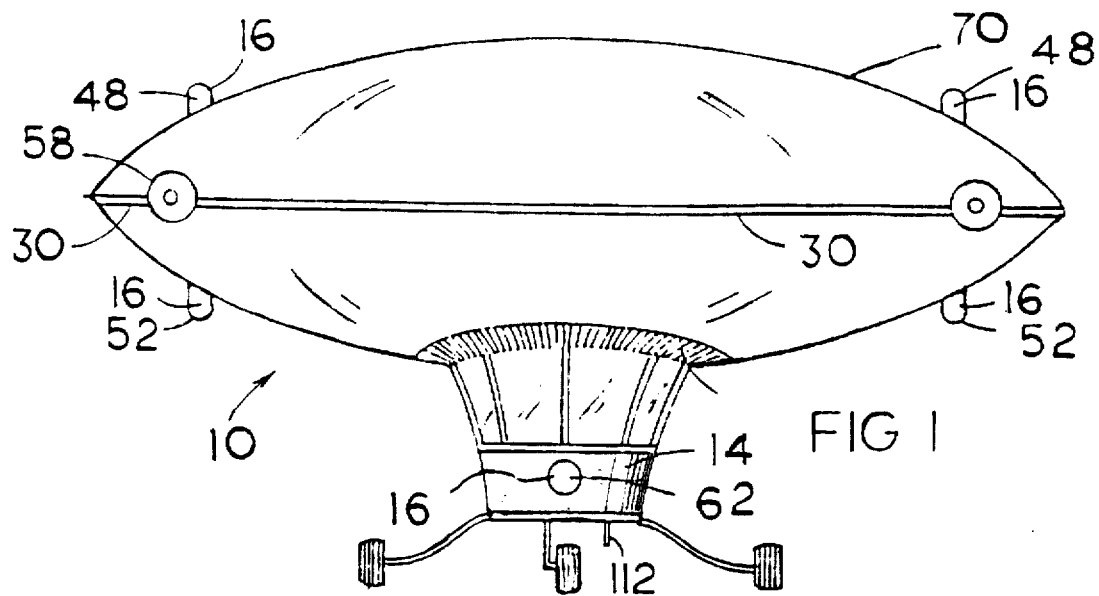
FIG. 1 is a rear elevational view of an airship of the invention
Figure 2:
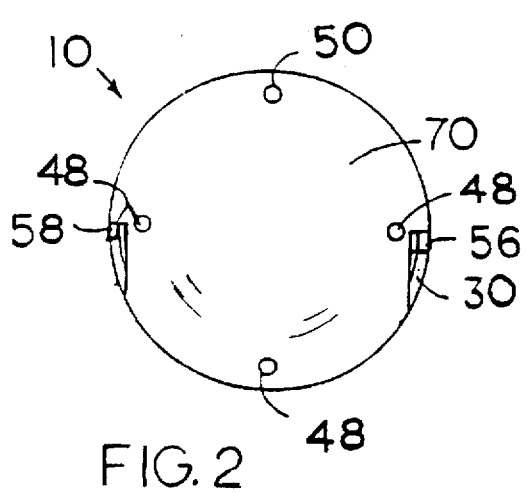
FIG. 2 is a top plan view thereof.
Figure 3:
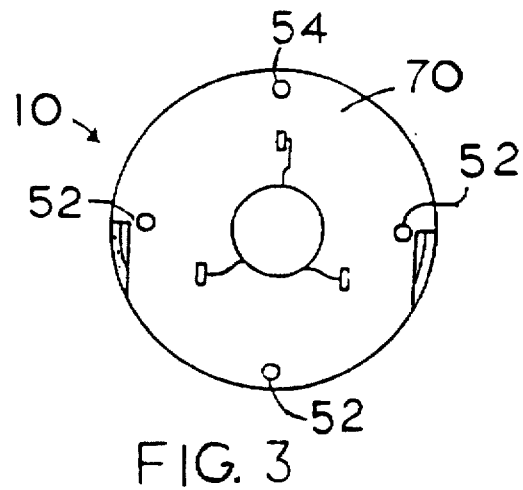
FIG. 3 is a bottom elevational view thereof.
Figure 4:
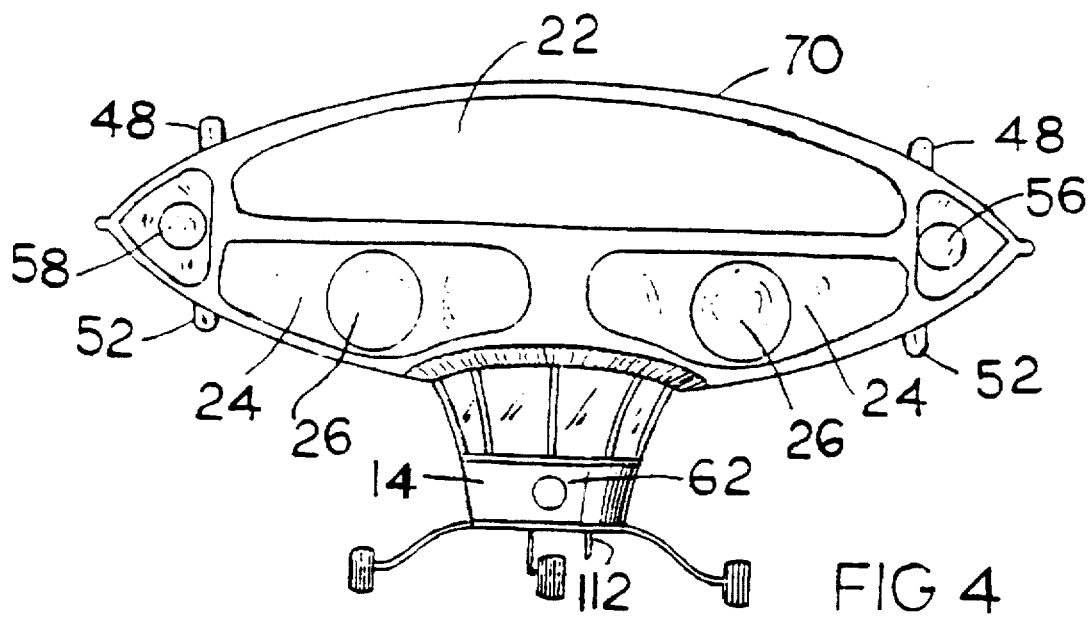
FIG. 4 is a rear elevational view of the airship partly cut away on a vertical midsection through the envelope.
Figure 5:
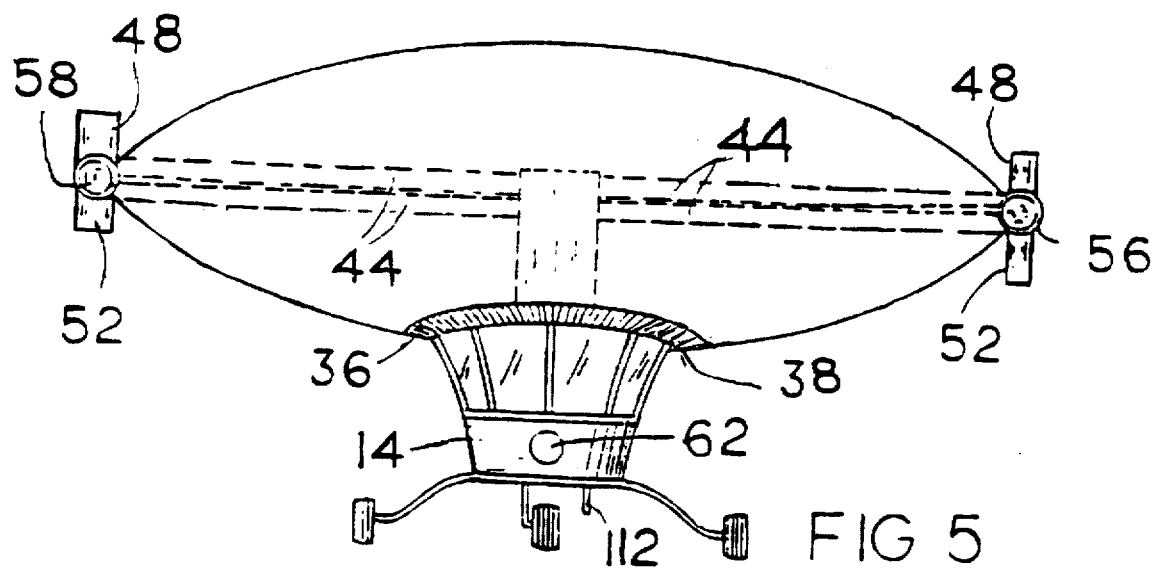
FIG. 5 is a rear elevational view of the airship showing the hidden ductwork in dashed-line phantom.
Figure 6:
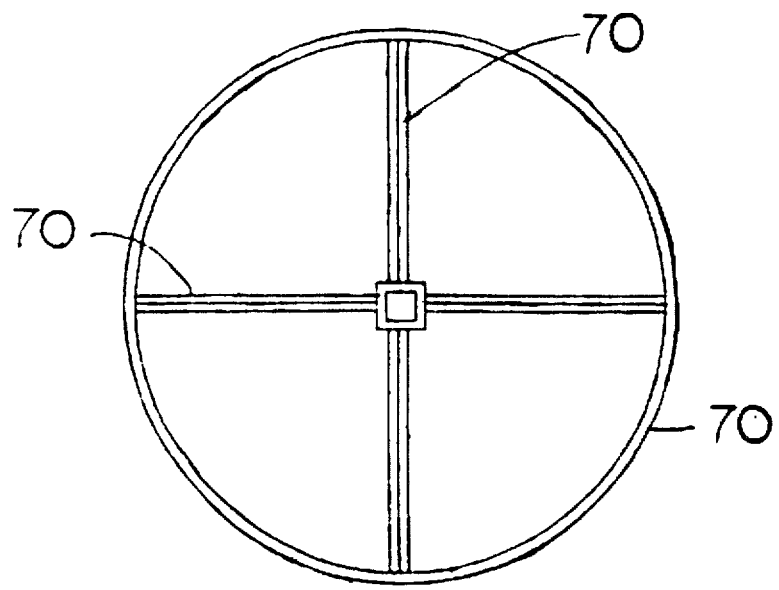
FIG. 6 is a bottom elevational view of a support structure internal to the airship
Figure 8:
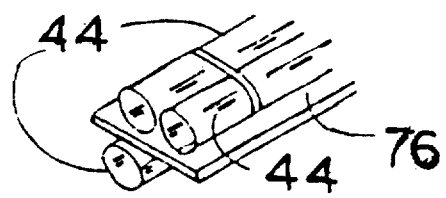
FIG. 8 is a perspective view of three ducts supported by another portion of the internal support structure.
Figure 9:
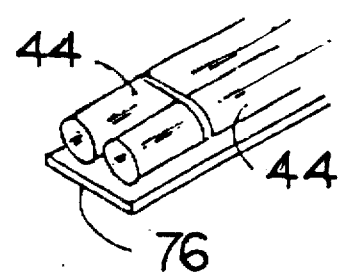
FIG. 9 is a perspective view of two ducts supported by the internal support structure.

Turning initially to FIGS. 1-3 of the drawing, one finds rear, top and bottom elevational views, respectively, of an airship 10 comprising a generally discoidal shaped envelope 12 and a gondola 14. A plurality of nozzles 16 disposed adjacent the periphery of the envelope 12 direct portions of a moving gas stream output from an engine 20 and to thereby control the motion of the airship 10, as will be described in greater detail hereinafter.

A plurality of gas containers 22, 24, 26, or bags, are disposed within the envelope 12. Each of these bags 22, 24, 26 contains a buoyancy gas. As is well known in the airship art, the preferred buoyancy gas is helium, as many other lighter-than-air gases and gas mixtures (e.g., hydrogen) are flammable or explosive. The top bag 22 is selected to fit into the upper half of the envelope 12—i.e., the portion above a peripheral support ring 30—and generally has the shape of a truncated prolate ellipsoid. The bottom bag 24 is preferably toroidal in shape, and surrounds a vertically disposed cylindrical engine chamber 32 that has a vertical axis generally coincident with the vertical axis of the airship 10. One or more ballonets 26 may be disposed within either the top 22 or bottom 26 bag and used, as is known in the airship art, to adjust the overall buoyancy of the airship 10.

In a preferred mode of operating the airship 10, first the lower bag 24 and then the upper bag 22 are inflated with helium until the fully loaded airship 10, with empty fuel tanks 34, attains a neutrally buoyant status. Fuel is then added to the tank 34 and thrust from the engine 20 is used to lift the airship 10, as will hereinafter be described.

The engine 20, disposed within the engine chamber 32 and coaxial therewith, has a downward-facing air inlet 36 above the gondola 14 that is preferably covered with a grill or screen 38. Inlet air preferably passes through an annular gap between the top 40 of the gondola 14 and a portion of the bottom of the envelope 12. The engine 20 is preferably a turbine engine, but may also be a propeller engine, or any other sort of internal combustion engine providing as an output a stream of rapidly flowing gases usable to provide thrust for the airship 10. The thrust stream from the engine 20 is directed by means of a plurality of valves 42, disposed adjacent the top of the engine chamber 32, to a respective plurality of ducts or thrust tubes 44 that convey the thrust to respective nozzles 46, each of which has a fixed orientation. In a preferred embodiment, there are eleven such nozzles 46, ten of which 48, 50, 52, 54, 58, 60 are adjacent the periphery of the envelope 12, and one of which 62 is at the rear of the gondola 14.

An array of eleven such ducts 44 and nozzles 46 are employed in a preferred embodiment and comprise several distinct subsets thereof. Four upwardly directed nozzles 48, 50 disposed adjacent the top of the envelope 12 provide a downward thrust on the airship 10 when a portion of the gas stream from the engine 20 is directed through them. Correspondingly, four downwardly directed nozzles 52, 54 disposed adjacent the bottom of the envelope 12 provide an upward thrust on the airship 10 when a portion of the gas stream from the engine 20 is directed through them. A horizontally and rearwardly directed nozzle 56 disposed on the mid-line 59 of the envelope 12 at the right-hand side of the airship 10 (i.e., at 90° from the front of the airship 10) is used to provide a thrust turning the airship 10 towards the left. A second horizontally and rearwardly directed nozzle 60 correspondingly disposed at 270° from the front of the airship 10 is used to provide a thrust turning the airship 10 towards the right. In addition to turning the airship 10 under operator control, the right 56 and left 60 side nozzles may be sized so as to overcome a torque on the airship 10 imposed by the rotation of the engine 20—i.e., making one or the other of these nozzles 56, 60 larger than the other can offset the engine's 20 reaction torque. The eleventh of these nozzles 46 is a horizontally and rearwardly directed nozzle 62 disposed at the rear of the gondola 14—i.e., near the center of mass of the airship 10.

Figure 7:
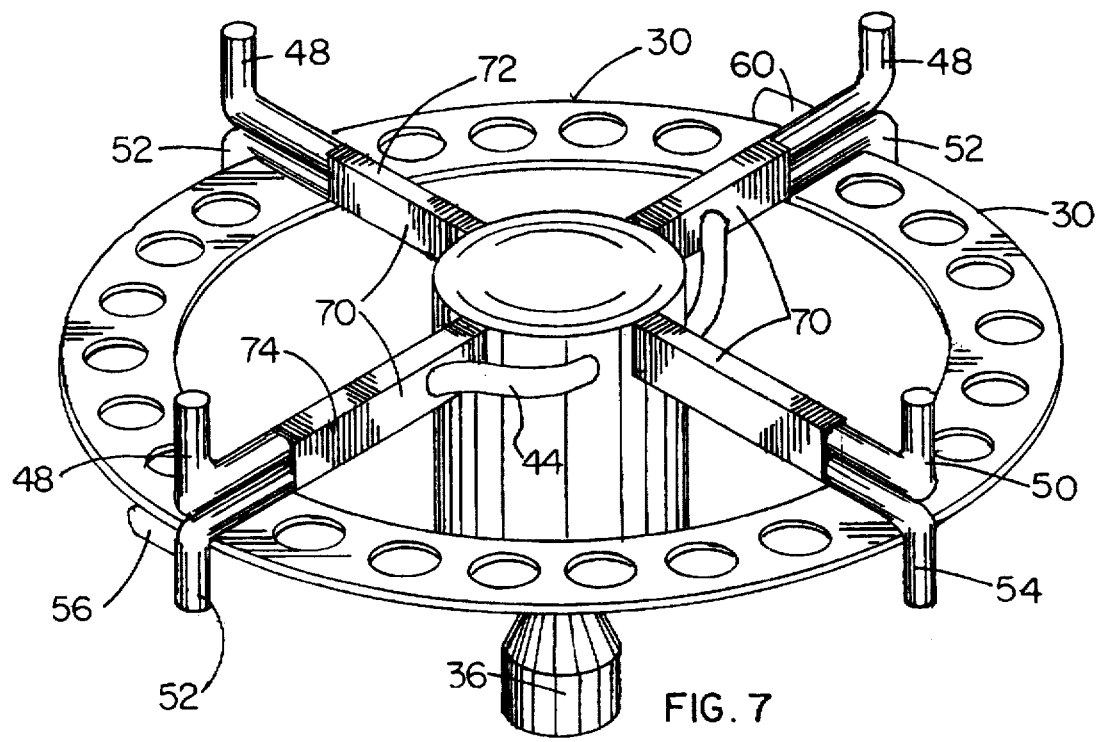
FIG. 7 is a cut-away perspective view of the engine chamber, ducting and internal support structure of the airship.

Structural support for the airship 10 may comprise a peripheral ring 30 connected to the engine chamber 32 by means of a plurality of radial arms 70. In one embodiment, depicted somewhat schematically in FIG. 7 of the drawing, where the diameter of the engine chamber 32 and the width of the peripheral ring 50 have been drawn oversize for clarity of presentation, the arms 70 comprise a set of four arms 72, 74. Two fore and aft directed tubular arms 72 have rectangular cross sections and each hold two of the ducts 44. Two laterally disposed arms 74 have triangular cross sections and each hold three of the ducts 44. Other arrangements for providing structural support and for restraining various of the ducts 44 can be used and comprise, inter alia, beams 76 that may be flat or have an I-beam configuration and that have various of the ducts 44 strapped thereto. Moreover, as is well known in the structural arts, the various structural members 50, 51 can be multi-element trusses or have an array of holes 78 formed therein in the interest of providing a higher strength to weight ratio.

Figure 10:
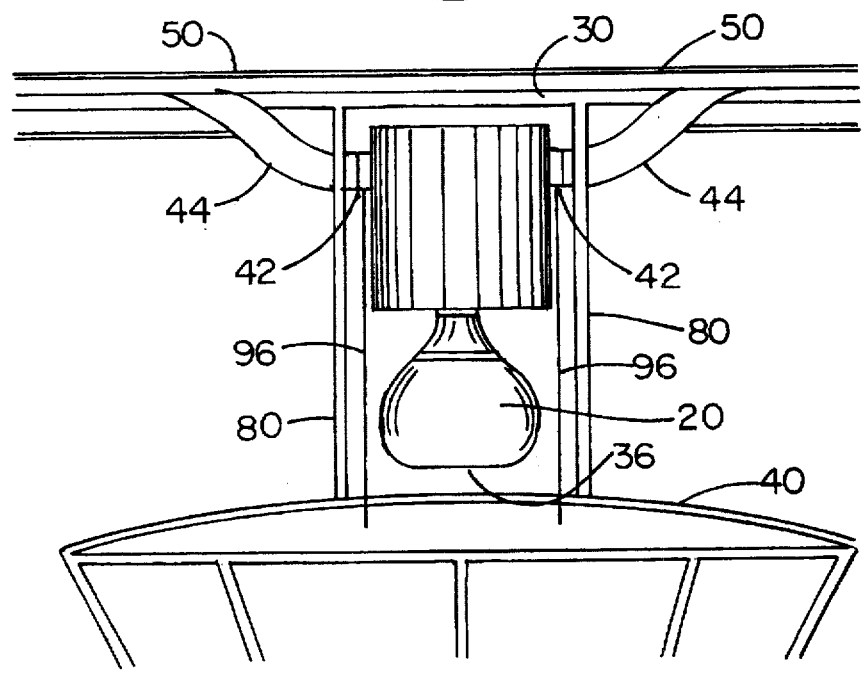
FIG. 10 is a side elevational view cut away to show the engine chamber and its attachment to the gondola.
Figure 11:
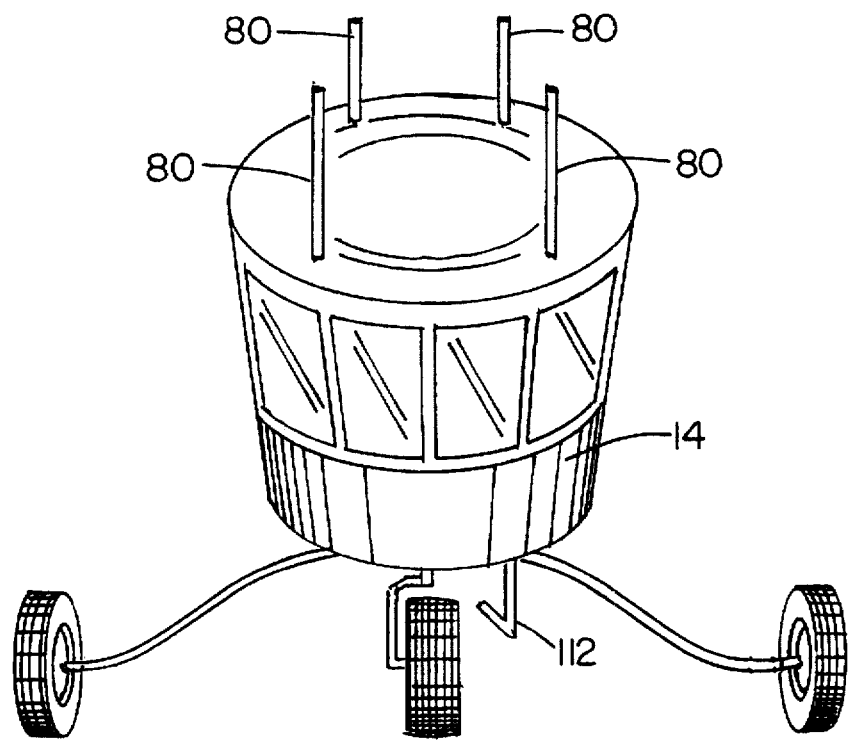
FIG. 11 is a front perspective view of the gondola.

The gondola 14, which may have a flat or curved top 40 surface, is preferably attached to the radial arms by a plurality of rods 80 or tubes extending upward from the floor 82 of the gondola 14, and passing adjacent the outer wall of the engine chamber 32, as depicted in FIGS. 10 and 11 of the drawing. An air intake screen 38, as discussed supra, is preferably disposed adjacent the top 40 of the gondola 14 to allow relatively unimpeded airflow into the engine 20.

Figure 12:
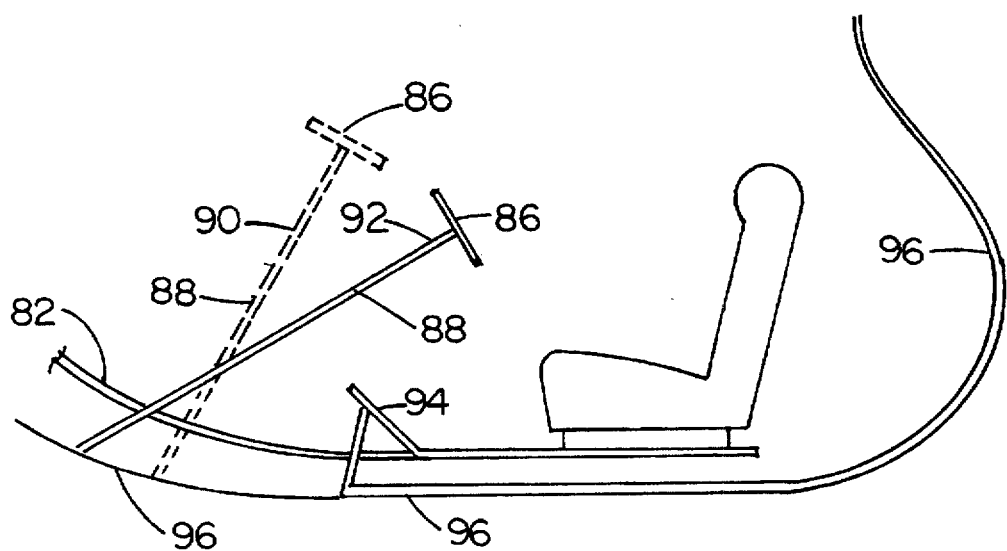
FIG. 12 is a schematic side view of the operator controls.

Turning now to FIG. 12 of the drawing, one finds a schematic depiction of an operator control portion 84 of a preferred control system of the invention. The operator controls 84 comprise a steering wheel 86 mounted in a conventional fashion on the upper end of a steering column 88 that is pivotally attached to the floor 82 of the gondola 14 for fore and aft pivotal motion between two limiting positions indicated as 90 and 92 in FIG. 12. An additional element of the operator controls 84 is a valving pedal 94 employed in conjunction with the pivoting motion of the column 88 to control the motion of the airship 10, as will be disclosed in detail hereinafter. The operator controls also comprise conventional means (not shown), such as a throttle lever, of controlling the speed of the engine 20.

The operator controls 84 are employed to regulate the distribution of gasses flowing through various of the ducts 44, so as to provide the thrusts desired for various operating modes of the airship 10. In a preferred embodiment this regulation is provided by an arrangement of sheathed cables 96 that operate valves 42 that open or close appropriate ones of the ducts 44 and thereby allow or prohibit thrust from the engine 20 from passing through the respective duct 44. Sheathed cables 96 comprising an inner wire 98 moving axially within a fixed sheath 100 are well known in aircraft and bicycle controls and may be used either as pairs of cables that oscillate a crank element in either of two directions or as a single cable used in combination with a spring (not shown) to move a controlled element in either of two directions.

Figure 13:
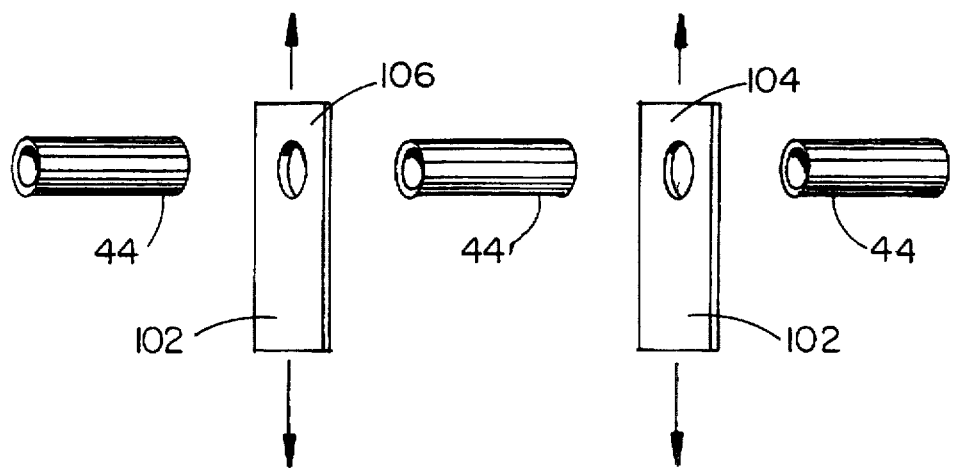
FIG. 13 is an exploded perspective view of a valve arrangement used in a preferred control system.
Figure 14:
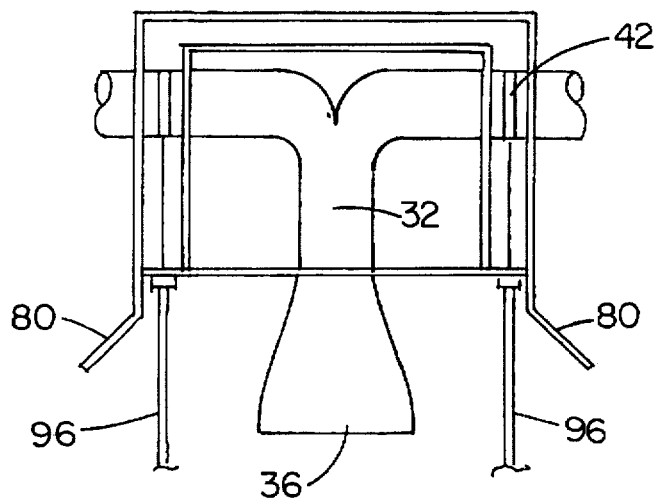
FIG. 14 is a partly cut away side view of a second embodiment of the engine and ducting.

In the preferred embodiment the flow of thrust gases through the ducts 44 is controlled with valves 42 comprising one or two gates 102. In one or more of the ducts 44 there is a single gate 104 controlled responsive to the position of the valving pedal 94. In ducts 44 having two gates 102, one of the gates 104 moves responsive to the valving pedal 94 and the other 106 moves responsive either to the fore and aft pivoting of the steering column 88 (e.g., as depicted in FIG. 13) or to the turning of the steering wheel 86. The centrally disposed rearward thrusting nozzle 62 is served by a duct 44 valved by a single gate or shutter 104 responsive to the position of the valving pedal 94.

In one embodiment of the invention, the gates 104, 106 operated by the valving pedal 94 and by the steering column 88, control thrust through all the upwardly 52, 54 and downwardly 48, 50 directed nozzles. This is shown in Table I, where the table entries are the positions of the various gates 104, 106.

TABLE I

| Nozzle | Position of Steering Column 88 | | | Position of Pedal 94 | | |
|---|---|---|---|---|---|---|
| | Forward | Centered | Aft | Up | Centered | Down |
| Nose lifter 50 | Closed | Half open | Open | Open | Open | Open |
| Other lifter 48 | Closed | Half open | Open | Closed | Half open | Open |
| Nose down 54 | Open | Half open | Closed | Open | Open | Open |
| Other down 52 | Open | Half open | Closed | Closed | Half open | Open |
| Horizontal nozzles 56, 58, 62 | Not controlled by column | Not controlled by column | Not controlled by column | Open | Half open | Closed |

In this same embodiment, turning the airship 10 by means of the horizontally directed nozzles 56,60 is carried out as indicated in Table II, which also recites the control of the gondola-mounted nozzle 62, even though that nozzle is not affected by turning the steering wheel 86 in the embodiment of the invention here described. It is noted that adding a gate 102 controlled by the steering wheel 86 to the nozzle 62 aft of the gondola 14 could provide an additional turning torque to that provided by the right 56 and left 60 nozzles, as could swiveling a gimbaled gondola nozzle 62.

TABLE II

| Nozzle | Position of Steering Wheel 86 | | | Position of Pedal 94 | | |
|---|---|---|---|---|---|---|
| | Hard left | Centered | Hard right | Up | Centered | Down |
| Right hand side 56 | Open | Half open | Closed | Open | Half open | Closed |
| Left hand side 58 | Closed | Half open | Open | Open | Half open | Closed |
| Gondola 62 | Open | Open | Open | Open | Half open | Closed |

As may be seen from the foregoing tables the airship 10 of the invention may be flown in a level attitude by centering the steering wheel 86 and steering column 88, allowing the valve pedal 94 to be in its normal upward position and controlling the engine speed to control thrust delivered through the three rearward horizontal nozzles 56, 60, 62.

Hovering, rather than flying forward, is accomplished by pressing the valving pedal 94 which acts to move a gate 104 across the ducts serving the three rearward directed nozzles 56, 60, 62. Right and left turns can be made by turning the steering wheel 86 so as to modulate the relative amount of thrust apportioned to two of the horizontal nozzles 56, 60 with the appropriate gate 106.

Lifting the nose of airship 10 is done by pulling the steering column 88 aft towards the pilot, which causes selected gates 102 to close three 52 upwardly thrusting nozzles, while allowing the fourth 54 upwardly thrusting nozzle in the nose of the airship 10 to remain open. In a corresponding manner, lowering the nose is accomplished by pushing the steering column 88 forward (i.e., away from the pilot), which causes selected ones of the gates 102 to close three downward thrusting 48 nozzles, while leaving the fourth downward thrusting nozzle 55 in the nose unobstructed.

The pilot can cause the airship 10 to fly vertically upward by pressing the valving pedal 94 and pulling the steering column 88 aft. This closes the ducts 44 leading to all four 48, 50 of the downwardly directed upwardly thrusting nozzles (i.e., the downward facing nozzle 50 in the nose of the aircraft is modulated in the same way as it is when the valving pedal 94 is not pressed, while the other three 48 are oppositely actuated) and closes all the ducts 44 leading to the four 52, 54 downward thrusting nozzles. Correspondingly, the pilot can fly the airship 10 vertically downward by pressing the valving pedal 94 and pushing the column 88 forward. This opens the ducts leading to the downward thrusting nozzles 52, 54 and closes the ducts leading to the upwardly thrusting ones 48, 50.

Figure 15:
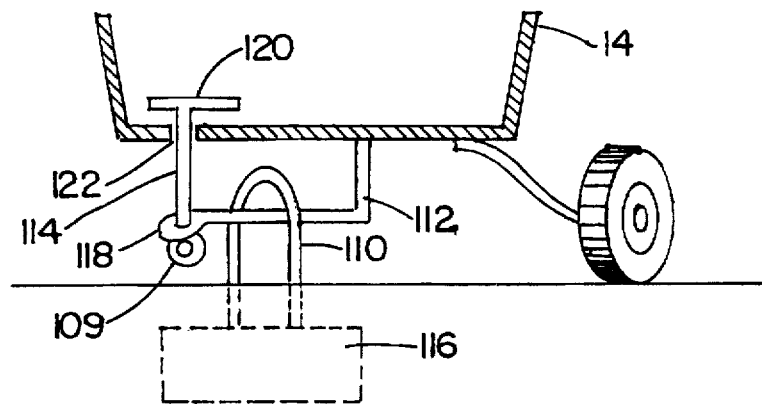
FIG. 15 is detail elevational view of a preferred tie-down apparatus of the invention.

Turning now to FIG. 15, one finds a tie-down arrangement for an airship 10. An eye 109 is formed from a metal rod 110 having the shape of an inverted "U" that is firmly affixed to the ground—e.g., by having both ends embedded in a buried block of concrete. A gondola rod 112, which is preferably L-shaped, protrudes in a generally forward direction from the bottom of the gondola 14 and engages the eye 109 when the pilot taxies the airship 10 into the mooring position. Once the eye 109 and rod 112 are engaged, the pilot can push the first end of a locking rod 114 through an appropriately located hole 122 in the bottom of the gondola 14 and connect the locking rod 114 to the free end 116 of the L-shaped probe 112. In FIG. 15 of the drawing, this is depicted as being done by passing the locking rod 114 through an eyelet 118 formed in the end of the gondola rod 112, although it will be recognized that other locking means could be easily used. The locking rod 114 preferably comprises retaining means 120, such as the T-shaped handle depicted in the drawing, holding the second end of the locking rod 114 in the gondola 14. Subsequently, a padlock or the like can be used to lock the locking rod 116 to the L-shaped rod 112 and thereby to secure the airship to the mooring station.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. An airship comprising:

an envelope supported at its periphery by a horizontal support ring;

a first gas container containing a buoyancy gas and disposed within the envelope above the support ring;

a second, toroidal, gas container containing the buoyancy gas, the second gas container disposed within the envelope below the support ring;

a vertically oriented engine disposed within an annular opening defined by the toroidal gas container, the engine having an engine axis coaxial with a vertical axis of the envelope, the engine having a downwardly facing inlet, the engine producing an upwardly directed thrust;

a plurality of ducts conveying thrust from the engine, each of the ducts having one end adjacent the axis and a second end attached to a respective nozzle; and a plurality of valves, each of the valves respectively associated with one of the plurality of ducts, each of the valves acting to open or close the respective duct.

2. The airship of claim 1 further comprising a gondola disposed below the envelope, wherein the plurality of ducts comprises eleven ducts, ten of the eleven ducts conveying thrust from the engine to the respective fixed nozzle disposed adjacent the periphery of the envelope, the eleventh duct conveying thrust from the engine to the respective fixed nozzle disposed adjacent the gondola.

3. The airship of claim 1 wherein: each of a first subset of the plurality of valves moves responsive to a rotation of a steering wheel; each of a second subset of the valves, the second subset distinct from the first subset, moves responsive to a fore and aft pivoting motion of a steering column; and each of a third subset of the valves, the third subset distinct from both the first and the second subsets of valves, moves responsive to the motion of a valving pedal.

4. The airship of claim 1 wherein each respective nozzle has a fixed orientation.

5. The airship of claim 1 wherein each of the valves is adjacent that end of the respective duct that is adjacent the axis.

6. In an airship comprising a gondola, a container containing a buoyancy gas, and an engine producing a stream of flowing gases providing a thrust, a control system comprising:

means dividing the stream of flowing gases among a plurality of ducts;

a steering wheel;

a first plurality of gate valves, the number of gate valves in the first plurality smaller than the number of ducts, each of the first plurality of gate valves disposed in one of the ducts, each of the first plurality of gate valves moving responsive to a rotation of the steering wheel;

a steering column attached to the gondola for fore and aft pivotal motion;

a second plurality of gate valves, the number of gate valves in the second plurality smaller than the number of ducts, each of the second plurality of gate valves disposed in one of the ducts and moving responsive to the pivotal motion of the steering column, none of the second plurality of gate valves disposed in a duct having one of the first plurality of gate valves disposed therein; and a valving pedal controlling the position of each of a third plurality of gate valves, each gate valve of the third plurality of gate valves disposed respectively in one of the ducts.

7. The control system of claim 6 wherein the first plurality of gate valves comprises two gate valves, one of the two gate valves disposed in a first duct conveying thrust to a first rearwardly directed nozzle disposed adjacent one side of the airship, the other of the two gate valves disposed in a second duct conveying thrust to a second rearwardly directed nozzle disposed adjacent the opposite side of the airship from the first rearwardly directed nozzle.

8. The control system of claim 6 wherein the second plurality of gate valves comprises eight gate valves, four of the eight gate valves disposed respectively in four of the ducts, each of the four of the ducts conveying thrust to an upwardly directed nozzle adjacent the periphery of the airship, the other four of the eight gate valves disposed respectively in the remaining four of the ducts, each of the remaining four of the ducts conveying thrust to a respective downwardly directed nozzle adjacent the periphery of the airship.

9. The control system of claim 6 wherein one of the ducts extends between the means dividing the thrust and a rearwardly directed nozzle adjacent the gondola.

* * * * *